(12) United States Patent
Gamble

(10) Patent No.: US 6,401,954 B1
(45) Date of Patent: Jun. 11, 2002

(54) PORTABLE CONTAINER AND METHOD FOR TRANSPORTING AND PROVIDING CONSUMABLE SUBSTANCES TO PETS

(76) Inventor: Bruce Gamble, 9316 Ewing Dr., Bethesda, MD (US) 20817

( * ) Notice: Subject to any disclaimer, the term of this patent is extended or adjusted under 35 U.S.C. 154(b) by 0 days.

(21) Appl. No.: 09/485,104
(22) PCT Filed: Aug. 15, 1997
(86) PCT No.: PCT/US97/14241
§ 371 (c)(1), (2), (4) Date: Jun. 19, 2000
(87) PCT Pub. No.: WO99/08938
PCT Pub. Date: Feb. 25, 1999

(51) Int. Cl.[7] ............................................. B65D 21/032
(52) U.S. Cl. ..................................... 220/23.86; 206/547
(58) Field of Search .......................... 220/23.83, 23.86; 206/547, 546; 224/610, 615

(56) References Cited

U.S. PATENT DOCUMENTS

| | | | |
|---|---|---|---|
| 1,015,455 A | * 1/1912 | Neesham | ..................... 206/546 |
| 1,373,156 A | 3/1921 | Tebbetts | |
| 1,809,596 A | 6/1931 | Nason | |
| 2,101,414 A | * 12/1937 | Stevens | ....................... 206/547 |
| 2,180,561 A | * 11/1939 | Stevens | ....................... 206/547 |
| 4,216,862 A | 8/1980 | Daenen | |
| 4,505,390 A | 3/1985 | Kirk, Jr. | |
| 4,899,693 A | 2/1990 | Arnold | |
| 5,056,424 A | 10/1991 | Lai | |
| 5,105,768 A | 4/1992 | Johnson | |
| 5,167,354 A | * 12/1992 | Cohanfard | ................... 224/610 |
| 5,301,829 A | * 4/1994 | Chrisco | ................... 220/23.83 |
| 5,511,685 A | * 4/1996 | Nelson | |
| 6,126,024 A | * 10/2000 | Ramirez et al. | ......... 220/23.86 |
| 6,186,352 B1 | * 2/2001 | Hwang | .................... 220/23.86 |

* cited by examiner

*Primary Examiner*—Stephen Castellano

(57) ABSTRACT

A portable container for transporting and providing consumable substances, preferably liquid, to pets includes a storage container for storing a substance and a removably attached serving container. The storage container includes a carrying strap to facilitate transport of the portable container and indicia, preferably a photograph, identifying the pet or pet owner. The indicia is covered by a lens to protect and maintain the indicia on the storage container. The storage container further includes a spout to facilitate transference of the substance to and from the storage container, and a spout cover to prevent spillage during transport. Tabs are disposed on the serving and storage containers wherein the tabs are positioned adjacent each other when the serving container is placed on the storage container to facilitate attachment and removal of the serving container from the storage container. The serving container is removed from the storage container to receive the substance from the storage container and to enable a pet to consume that substance.

11 Claims, 3 Drawing Sheets

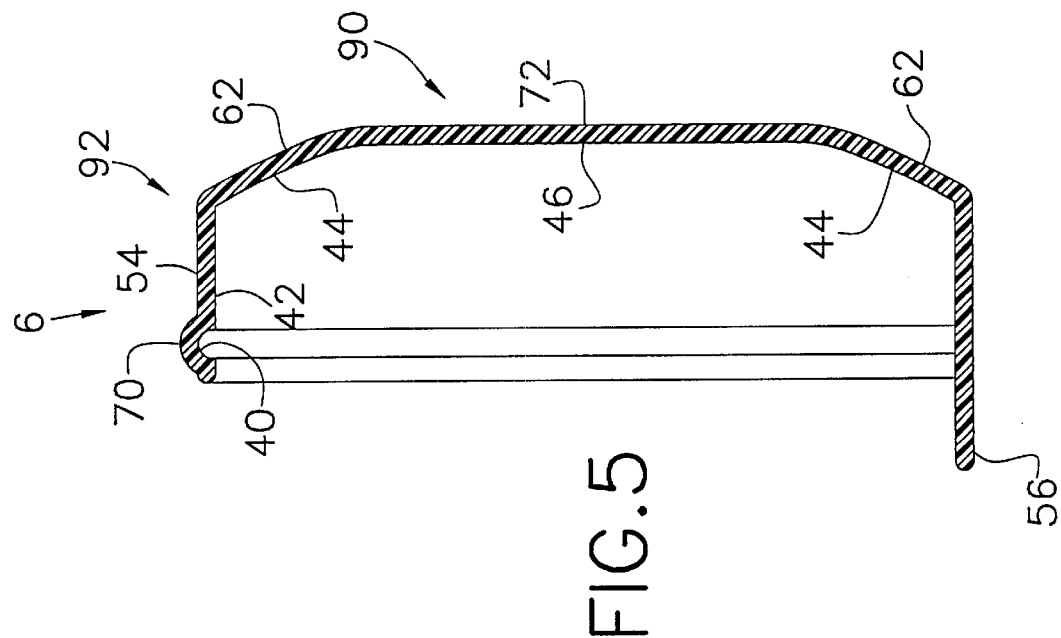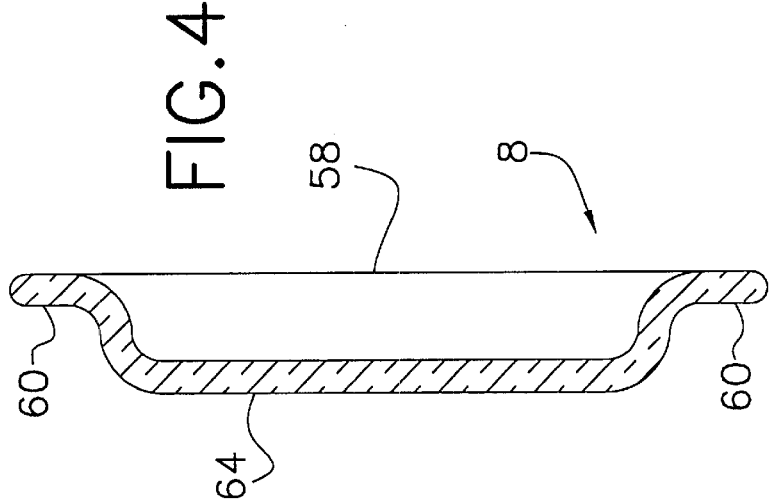

PORTABLE CONTAINER AND METHOD FOR TRANSPORTING AND PROVIDING CONSUMABLE SUBSTANCES TO PETS

BACKGROUND OF THE INVENTION

1. Technical Field

The present invention pertains to portable containers that store and provide consumable substances, preferably liquid, to pets (e.g., animals). In particular, the present invention pertains to a portable container that transports a consumable substance for a pet, preferably liquid, and includes a removable serving container to enable the pet to consume the substance transported by the portable container.

2. Discussion of Prior Art

Conventional portable containers commonly include canteens that are typically utilized for transporting liquids consumed by people. These liquid containers are usually employed to provide liquid at a remote location where a drinking facility is not readily accessible. For example, canteens may be used when camping, hiking or engaging in other activities that restrict access to drinking facilities. Conventional canteens typically include a reservoir for storing liquid and an opening to enable access to the reservoir for placement and removal of liquid from the canteen. The opening is generally of sufficient size to enable a person to consume the stored liquid directly through the opening.

Frequently, pets (e.g., animals) accompany their owners during walks, hikes and other activities. These activities may dehydrate the owner and pet, and are usually engaged at remote locations having limited or no access to drinking facilities. Although canteens may be utilized for liquid transport and storage, the canteens are cumbersome for providing liquid to pets. In particular, the canteen opening is generally of insufficient size to enable pets, particularly dogs and cats, to access liquid stored within the canteen. Further, pets are typically accustomed to consuming liquid from a dish or bowl, and may have tremendous difficulty in consuming free flowing liquid from a relatively small canteen opening.

The prior art has attempted to overcome the above described disadvantages of utilizing canteens for providing liquid to pets. In particular, U.S. Pat. No. 5,105,768 (Johnson) discloses an animal canteen having a container serving as a reservoir to store liquid wherein the container includes an access aperture of sufficient size to enable pets (e.g., animals) to access stored liquid. The canteen further includes a lid to prevent spillage when the pet is not consuming liquid from the canteen. The lid on the Johnson patent is screwed onto the unit and, in order to remove the lid without spillage of the contents, the unit must be firmly steadied against a horizontal support surface or held awkwardly by the user. In either case, the lid removal process is inconvenient. Further, U.S. Pat. No. 4,899,693 (Arnold) discloses a cooled pet bed having an insulated base with a central recess for receiving a container that stores ice cubes. The upper surface of the container is covered by a fabric mattress to accommodate the pet wherein the container includes a carrying strap and may be utilized as a canteen for drinking water, while the pet base may serve as a pet drinking dish.

The prior art suffers from several disadvantages. Specifically, the Johnson animal canteen permits a pet to directly access liquid stored within a container, thereby enabling germs or other contaminates to be transferred to the stored liquid during consumption of the stored liquid by the pet. Thus, the consumption of the stored liquid by the pet contaminates the entire supply of stored liquid. Further, since the Arnold pet bed container serves as a mattress, the pet bed container is typically of sufficient size to accommodate a reclining pet and, therefore, must be relatively large and extremely cumbersome to transport. In addition, prior art animal canteens generally do not provide a manner for identifying the pet or owner associated with the canteen.

It is also desirable that water or other liquid being transported on a walk or hike be consumable by both the pet and his owner. The Johnson canteen cannot be so used hygienically since use by the pet contaminates the entire supply of liquid, rendering it unusable by the owner. The Arnold pet bed container, apart from other deficiencies, is simply too large and bulky for transport on a walk or hike.

OBJECTS AND SUMMARY OF THE INVENTION

Accordingly, it is an object of the present invention to transport and provide convenient access to a consumable substance, preferably liquid, for a pet via a portable container having a removable serving container for enabling the pet to consume the substance.

It is another object of the present invention to transport and provide convenient access to a consumable substance, preferably liquid, for a pet via a portable container having a substantially flat bottom to enable the portable container to maintain an upright position when placed on a relatively horizontal surface.

Yet another object of the present invention is to distribute a transported consumable substance, preferably liquid, stored within a portable container to a pet via a serving container removably attached to the portable container wherein the portable container and serving container each include tabs to enable attachment and removal of the serving container from the portable container.

A further object of the present invention is to provide a method and apparatus for conveniently transporting and accessing a liquid during a walk or hike such that a pet and its owner can consume the liquid without the pet contaminating liquid consumed by the owner.

Still another object of the present invention is to identify a pet or owner associated with a portable container by disposing on the portable container indicia identifying the pet or owner (e.g., a photograph) with the indicia being covered by a lens.

The aforesaid objects are achieved individually and in combination, and it is not intended that the present invention be construed as requiring two or more of the objects to be combined unless expressly required by the claims attached hereto.

According to the present invention, a portable container for transporting and providing a consumable substance, preferably liquid, to a pet includes a storage container and a removable serving container that functions as a pet dish or bowl. The storage container includes a generally circular cross-section having a tapered substantially flat bottom portion for enabling the storage container to maintain an upright position when placed on relatively horizontal surfaces. It is to be understood that the terms "top", "bottom", "side", "upper", "lower", "front", "rear", "back", "horizontal" and "vertical" are used herein merely to facilitate descriptions of points of reference and do not limit the present invention to any specific configuration or orientation. The storage container further includes a spout permitting the consumable substance to be placed in or removed from the storage container interior, and an associated spout screw-on or snap fit cap or cover that prevents spillage during storage and/or transport of the substance. The cap is sized to be easily removed when grasped between the user's thumb and forefinger. The spout extends from an upper portion of the storage container, while the cap may be attached to the storage container via a retainer, such as a string or band, to prevent loss of the cap during use. The front exterior surface of the storage container includes a substantially circular recess for receiving a photograph of a pet or other indicia identifying the pet or owner, and a lens for covering the photograph. The lens is preferably clear to enable the photograph to be viewed. In addition, tabs or ears are disposed on the storage container wherein the tabs each include an opening for attaching a carrying strap to the storage container. The ends of the carrying strap are each typically inserted through a corresponding tab opening to engage the storage container for transport. The tabs also serve as a mechanism for attaching and removing the serving container from the storage container as described below.

The removable serving container receives a stored substance from the storage container and serves as a pet dish or bowl to enable a pet to consume the stored substance. The serving container includes an open front and a generally circular cross-section having a tapered substantially flat bottom portion similar in shape to the storage container, but with slightly larger dimensions. The bottom portion of the serving container transversely extends from the serving container interior in the form of a ledge wherein the serving container is disposed over and covers the rear portion of the storage container with the ledge coincident the storage container bottom. Tabs or ears are disposed on the serving container with slots disposed adjacent the serving container tabs. When the serving container is secured to the storage container, the serving container receives the storage container tabs within the serving container slots, while the serving container tabs are disposed adjacent the storage container tabs. The serving container and storage container tabs facilitate placement and removal of the serving container from the storage container via application of appropriate forces to the tabs.

The portable container is initially filled with a consumable substance for a pet, preferably liquid, and is transported by the pet or owner. When a pet desires the consumable substance, the serving container is removed from the portable container and the stored substance from the storage container is placed within the serving container for consumption by the pet. The owner can consume the liquid by drinking directly from the spout or by pouring the liquid into a separate cup. In either case, the pet does not contaminate the liquid that is consumed by the owner.

The above and still further objects features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 4 is a side view in elevation and partial section of a lens for covering identification indicia disposed on the portable container of FIG. 1.

FIG. 5 is a side view in elevation and partial section of the removable serving container of the portable container of FIG. 1.

DESCRIPTION OF THE PREFERRED EMBODIMENT

Figure 1:
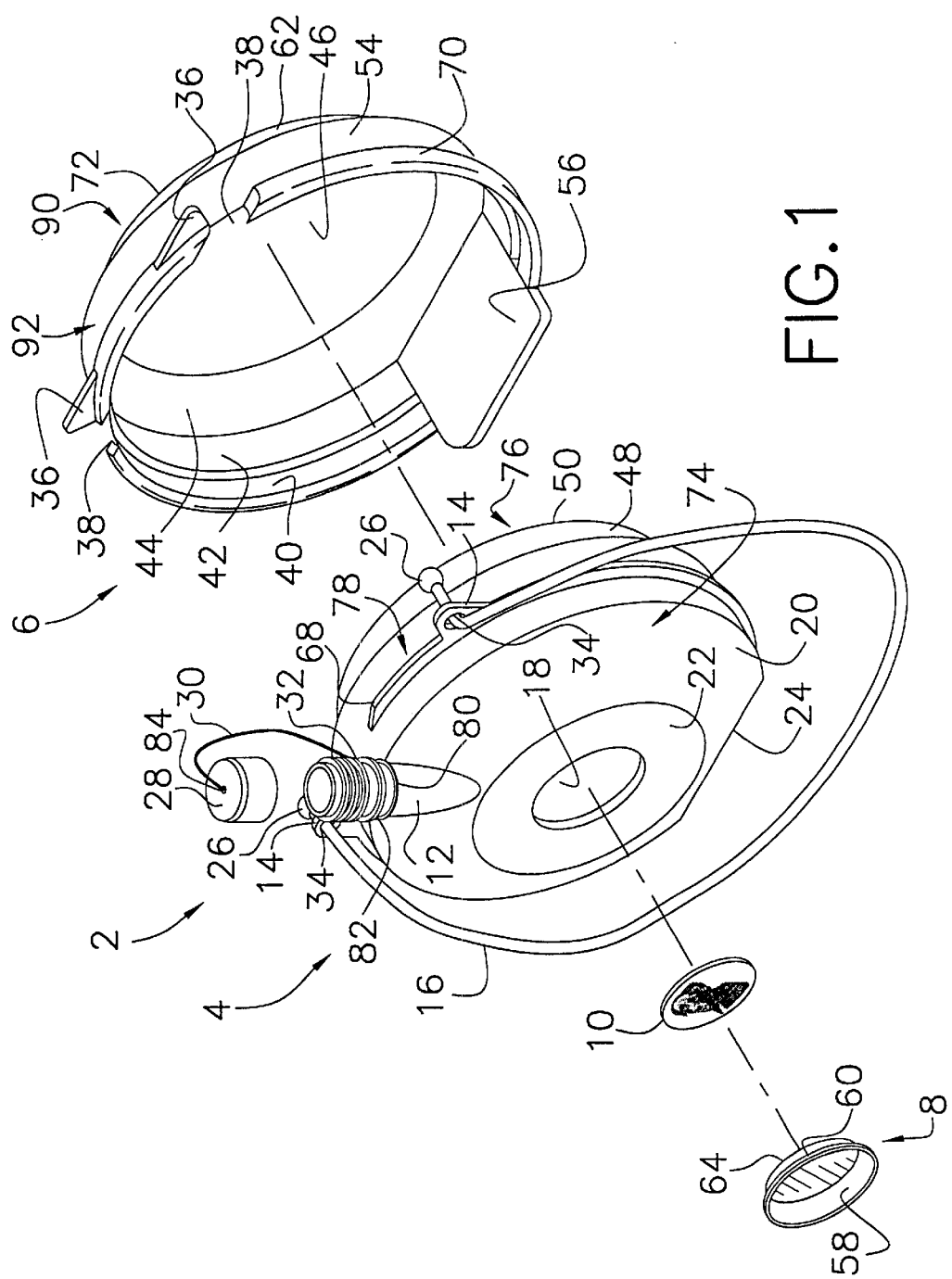
FIG. 1 is an exploded view in perspective of a portable container for transporting and providing a consumable substance to a pet according to the present invention.

A portable container for transporting and providing a consumable substance, preferably liquid, to a pet, typically a dog, cat or other animal, is illustrated in FIG. 1. Specifically, portable container 2 includes a storage container 4 and a removable serving container 6. Storage container 4 typically stores the consumable substance, preferably liquid, for transport and includes a recess 18 defined in its front exterior surface. It is to be understood that the terms "top", "bottom", "side", "upper", "lower", "front", "back", "rear", "horizontal" and "vertical" are used herein merely to facilitate descriptions of points of reference and do not limit the present invention to any specific configuration or orientation. Recess 18 typically receives a photograph 10 or other indicia identifying an owner or pet, and a lens 8 to cover the photograph as described below. Serving container 6 is typically shaped to fit the contour of, and is removably disposed over, the rear portion of storage container 4. Serving container 6, when detached from storage container 4, serves as a typical pet dish or bowl to receive the stored substance from storage container 4 and to enable a pet to consume that substance. The serving container further isolates the substance portion remaining within the storage container from germs and other contaminates transferred by the pet during consumption of the substance since only the substance residing in the serving container is exposed to the pet. Thus, only the portion of the stored substance transferred to the serving container may be exposed to contamination by the pet, thereby avoiding contamination of the entire substance supply.

Figure 3:
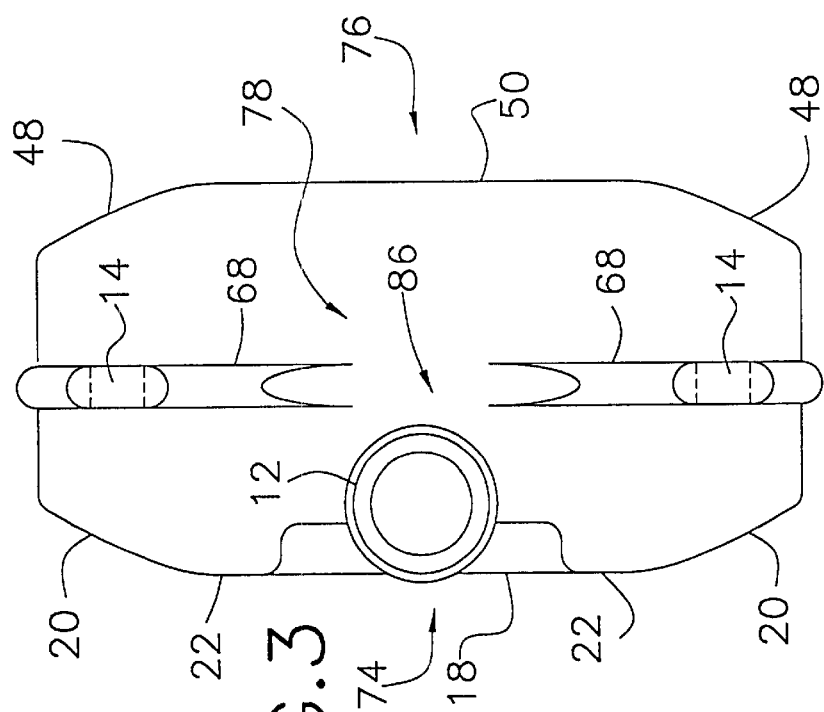
FIG. 3 is a top view of the storage container of FIG. 2.
Figure 2:
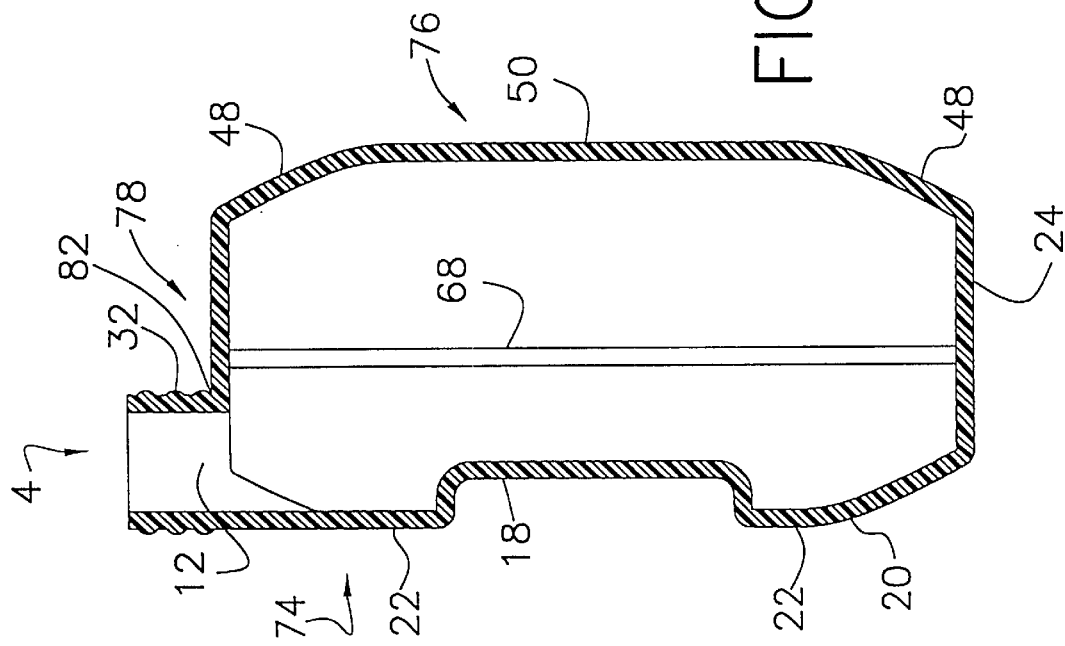
FIG. 2 is a side view in elevation and partial section of the storage container of the portable container of FIG. 1.

Referring to FIGS. 1, 2 and 3, storage container 4 has a generally circular cross-section tapered to form a substantially flat bottom that enables the portable container to maintain an upright position when placed on a relatively horizontal surface. The storage container includes a substantially rectangular bottom wall or base 24, front and rear walls 74, 76 and an intermediate wall 78 that collectively define the storage container interior. The front and rear walls are substantially circular with a tapered substantially flat bottom portion (i.e., the front and rear walls each include a tapered or cut-off bottom portion), and extend substantially in parallel from the front and rear edges of bottom wall 24, respectively. Intermediate wall 78 is substantially rectangular and curved to extend from bottom wall 24 along and between the front and rear wall perimeters to connect the front and rear walls and to partially define the storage container thickness. The storage container may be of any size, shape or color and may be constructed of plastic or any other suitably sturdy material, however, by way of example only, the storage container may include a height of approximately eight inches, a diameter (i.e., for the non-tapered portion of the container cross-section) of approximately nine inches and a thickness (i.e., the distance between the front and rear walls) of approximately four inches, and may be constructed of water impervious food grade polyethylene. Front wall 74 includes a substantially circular recess 18 disposed at the approximate center of the front wall exterior surface. Recess 18 typically receives a photograph 10 or other identification indicia indicating the owner or pet to which the portable container belongs. The recess may alternatively be of any size, shape or depth capable of containing identification indicia, however, by way of example only, the recess may include a diameter of approximately three inches. Photograph 10 is typically of sufficient size to be placed within recess 18, while a lens 8 covers the photograph to protect and maintain the photograph within the recess as described below.

Front wall 74 further includes a series of nested exterior surfaces 20, 22 disposed consecutively between intermediate wall 78 and recess 18. In particular, outer surface 20 is substantially annular with a tapered flat bottom portion disposed coincident bottom wall 24. Outer surface 20 is disposed adjacent intermediate wall 78 and occupies the portion of the front wall exterior surface extending along the front wall perimeter between intermediate wall 78 and inner surface 22. Further, outer surface 20 is typically sloped at an acute angle such that the outer surface extends slightly outward from the storage container interior. Inner surface 22 is substantially annular and is disposed adjacent and within the confines of outer surface 20. The inner surface occupies the portion of the front wall exterior surface extending along and between the outer surface and recess perimeters. Inner surface 22 may be oriented such that the inner surface is either not sloped, or sloped slightly inward at an acute angle toward the storage container interior.

A substantially cylindrical spout or neck 12 is disposed at the intersecting edges of front and intermediate walls 74, 78 toward the upper portion of the front wall. The spout extends from the storage container interior through the storage container front and intermediate walls to provide a passage that enables a consumable substance to be placed within and removed from the storage container interior. The cross-sectional dimensions of the spout extend beyond the intermediate wall edge wherein a residual spout portion is disposed on outer surface 20 of front wall 74 to maintain the cross-sectional dimensions of the spout and passage. The spout portion disposed on the front wall is cut by angled outer surface 20 such that a tapered portion of the spout is disposed on the front wall and essentially forms a hump on outer surface 20. Angled outer surface 20 tapers the spout portion proximally as the spout portion extends on angled outer surface 20 from intermediate wall 78 toward inner surface 22. Spout 12 includes threads 32 disposed about an exterior surface of the spout distal end for receiving a cap or cover 28. Cap 28 preferably includes threads (not shown) disposed about the cap interior surface that engage threads 32 to secure the cap to the spout. Cap 28 may be easily removed from spout 12 by simply grasping the cap between one's thumb and forefinger and rotating the cap relative to the spout. A stop ledge 82 is disposed about the spout slightly below threads 32 wherein the stop ledge enables proper placement of the cap on the spout. Cap 28 may be attached to the storage container via a string 30 or other fastening device that is connected to a retaining ring 80 disposed about the spout slightly below stop ledge 82. String 30 is typically attached to the cap via insertion within an opening 84 defined at the approximate center of the cap top surface. The cap may be of any shape and may be connected to the spout via any fastening or attachment techniques.

A ridge 68 or other projection is typically disposed on the exterior surface of intermediate wall 78 between spout 12 and rear wall 76. The ridge is utilized by serving container 6 to secure the serving container to the storage container as described below. Ridge 68 extends from bottom wall 24 along intermediate wall 78 wherein the ridge includes a small gap or recess 86 disposed coincident spout 12. Ridge 68 typically includes a pair of tabs or ears 14 disposed toward spout 12 and separated by an angular distance of approximately ninety degrees such that the spout resides between the tabs. Each tab 14 extends from ridge 68 to form a rounded peak or apex, and includes an opening 34 to enable a carry strap 16 (or rope, cord, chain, etc.) to engage the storage container. Openings 34 each receive an end of carry strap 16 wherein the carry strap ends are inserted through the openings into corresponding stoppers 26. Carry strap 16 may be any strap, band, string or other device capable of supporting the portable container, and preferably contains sufficient length to enable the strap to be placed around an appropriate body part of an owner or pet (e.g., hand, arm, shoulder, neck, etc.). Stoppers 26 may be implemented by a ball or buckle or other device having dimensions larger than corresponding tab openings 34 to maintain carry strap 16 through the openings and enable the carry strap to support the weight of the portable container. The angular positions of the tabs enable the storage container to maintain an upright position during transport by the carry strap, and provide a stable location for the carry strap to engage and support the weight of the storage container. The tabs may be of any shape or size and may be disposed on the container in any quantity or fashion capable of securing the strap to the portable container.

Rear wall 76 of storage container 4 is similar to front wall 74 except that the rear wall does not include recess 18, or spout 12. Specifically, rear wall 76 includes nested exterior surfaces 48, 50 consecutively extending from the edge of intermediate wall 78 toward the rear wall center. Rear outer surface 48 is substantially annular with a tapered flat bottom portion disposed coincident bottom wall 24. Outer surface 48 disposed adjacent intermediate wall 78 and occupies the portion of the rear wall exterior surface extending along the intermediate wall perimeter between the intermediate wall and rear inner surface 50. Further, rear outer surface 48 is typically sloped at an acute angle such that the rear outer surface extends slightly outward from the storage container interior. Rear inner surface 50 is substantially circular and is disposed adjacent and within the confines of rear outer surface 48 to occupy the remaining portion of the rear wall exterior surface. Rear inner surface 50 may be oriented such that the rear inner surface is either not sloped, or sloped slightly inward at an acute angle toward the storage container interior. The storage container interior surfaces (not shown) follow the contour of the exterior surfaces described above to define the storage container interior.

Lens 8 for covering and maintaining a photograph 10 or other identification indicia within recess 18 is illustrated in FIGS. 1 and 4. Specifically, lens 8 is typically implemented by a substantially clear lens that enables viewing of the photograph, and includes a substantially circular front surface 58 and a substantially circular rear surface 64. Rear surface 64 includes dimensions slightly larger than recess 18 to ensure a snug fit within the recess, while front surface 58 includes dimensions larger than rear surface 64. The cross-sectional diameter of the lens remains relatively constant toward rear surface 64, then sharply transitions to the larger surface dimension toward front surface 58 to form an overhang 60. Overhang 60 transversely extends from front surface 58 and is utilized to secure and remove the lens from the storage container. In particular, lens 8 is disposed within recess 18 by applying a pushing force to front surface 58 and/or overhang 60 such that rear surface 64 is disposed within recess 18 adjacent photograph 10 toward the recess bottom. The peripheral portion of front surface 58 or, in other words, overhang 60 extends beyond the recess boundaries onto inner surface 22 to secure the photograph within the recess. Conversely, lens 8 may be removed from recess 18 by applying a pulling force to front surface 58 and/or overhang 60 until the lens is withdrawn from the recess. The lens may be of any shape and may be made of various materials having any color capable of permitting viewing of the photograph, however, by way of example only, the lens is constructed of clear polycarbonate.

Serving container 6 for enabling a consumable substance stored in storage container 4 to be consumed by a pet is illustrated in FIGS. 1 and 5. Specifically, serving container 6 has a generally circular cross-section tapered to form a substantially flat bottom portion substantially similar to the cross-sectional shape of storage container 4, but having slightly larger dimensions. The serving container includes a substantially rectangular flat bottom portion or wall 56 and rear and body walls 90, 92, respectively, wherein the bottom, rear and body walls collectively define the serving container interior. Bottom wall 56 transversely extends outward in the form of a ledge from the serving container interior adjacent rear wall 90 to beyond the serving container periphery. Bottom wall 56 covers bottom wall 24 of storage container 4 when the serving container is attached to the storage container as described below. Rear wall 90 is substantially circular with a tapered substantially flat bottom portion and extends from a rear edge of bottom wall 56. Body wall 92 is substantially rectangular and curved to extend from bottom wall 56 along the rear wall perimeter. Serving container 6 further includes an open front and serves as a pet dish or bowl for receiving the substance stored in storage container 4 and enabling a pet to consume that substance.

A channel or groove 40 or other receptacle is disposed on the interior surface of body wall 92 and extends from bottom wall 56 about the serving container periphery. The channel width is slightly greater than the width of ridge 68 disposed on the storage container to enable the channel to engage the ridge for attachment of the serving container to the storage container as described below. A pair of slots 38 are formed within channel 40 toward the upper portion of the serving container coincident tabs 14 disposed on storage container 4. Slots 38 enable the serving container to be disposed on the storage container with each tab 14 being received within a corresponding slot 38. Serving container tabs or ears 36 are disposed on an exterior surface 70 of channel 40 adjacent slots 38 such that tabs 36 each reside between the slots and are typically separated by an angular distance slightly less than ninety degrees. Tabs 36 are similar in shape to tabs 14 of the storage container, but may be of any shape, and enable removal and placement of serving container 6 onto storage container 4. Specifically, serving container 6 is typically positioned on storage container 4 with respective tabs 14, 36 separated by a slight distance. Forces directing tabs 14, 36 toward each other are applied to the respective tabs to enable channel 40 to engage ridge 68, thereby snapping the serving container onto the storage container. Conversely, when the serving container is secured to the storage container, forces directing tabs 14, 36 away from each other are applied to the respective tabs to enable channel 40 to disengage from ridge 68 and remove the serving container from the storage container.

The exterior surface of body wall 92 includes a ridge or rib 70 and an exterior surface 54. Rib 70 is disposed about the serving container periphery and extends from bottom wall 56 along body wall 92. The rib is essentially the external surface of channel 40 defined in the interior surface of the serving container described above. Exterior surface 54 is disposed adjacent rib 70 and is indented relative to the rib wherein surface 54 extends from bottom wall 56 along and between the perimeters of rib 70 and rear wall 90. Rear wall 90 includes a series of nested exterior surfaces 62, 72 consecutively extending from the edge of body wall 92 toward the rear wall center. Specifically, exterior surface 62 is substantially annular with a tapered substantially flat bottom portion disposed coincident bottom wall 56. Surface 62 is disposed adjacent body wall 92 and occupies the portion of the rear wall exterior surface extending along the rear wall perimeter between body wall 92 and surface 72. Surface 62 is sloped at an acute angle such that surface 62 extends slightly outward from the serving container interior. Exterior surface 72 is substantially circular and is disposed adjacent and within the confines of surface 62 to occupy the remaining portion of the rear wall exterior surface.

The serving container interior similarly includes a series of interior surfaces that follow the contour of the exterior surfaces described above. Specifically, the interior surface of body wall 92 includes channel 40 described above and interior surface 42. Interior surface 42 is disposed adjacent channel 40 and is indented relative to the channel wherein surface 42 extends from bottom wall 56 along and between the perimeters of channel 40 and rear wall 90. Surface 42 covers the portion of intermediate wall 78 extending between ridge 68 and rear wall 76 when the serving container is placed on the storage container. Rear wall 90 includes a series of nested interior surfaces 44, 46 consecutively extending from the edge of body wall 92 toward the rear wall center. In particular, interior surface 44 is substantially annular with a tapered substantially flat bottom portion disposed coincident bottom wall 56. Surface 44 is disposed adjacent body wall 92 and occupies the portion of the rear wall interior surface extending along the rear wall perimeter between body wall 92 and surface 46. Surface 44 is sloped at an acute angle to extend slightly outward from the serving container interior, and covers rear outer surface 48 when the serving container is placed on the storage container. Interior surface 46 is substantially circular and is disposed adjacent and within the confines of surface 44 to occupy the remaining portion of the rear wall interior surface. Surface 46 covers rear inner surface 50 when the serving container is placed on the storage container. The serving container is typically oriented such that surface 46 serves as the interior bottom of the serving container when using the serving container to provide substance to a pet. The serving container may be of any size, shape or color, and may be constructed of various materials. By way of example only, the serving container may include a height slightly greater than eight inches, a diameter (i.e., for the non-tapered portion of the container cross-section) slightly greater than nine inches and a thickness or depth of approximately three inches, and may be constructed of food grade polyethylene.

The manner in which the portable container may be utilized is described with reference to FIG. 1. Initially, identification indicia, typically a photograph 10, is placed within recess 18 of storage container 4 with lens 8 disposed over the photograph. The lens fits snugly in the recess wherein the lens may be placed in or removed from the recess by applying force to front surface 58 and/or overhang 60 as described above. Serving container 6 is positioned on the rear portion of the storage container via tabs 14, 36 such that channel 40 engages ridge 68 to secure the serving container to the storage container as described above. Cap 28 is removed from spout 12 and the storage container is supplied with liquid or other food type substance for transport. After filling the storage container, the cap is placed back on the spout to prevent spillage. A carrying strap 16 may be attached to storage container tabs 14 as described above for transport of the portable container by an owner or pet. The storage container may be filled prior or subsequent to placement of the identification indicia, carry strap or serving container on the storage container.

During transport, when the contents of the storage container are to be consumed by a pet and/or pet owner, the serving container is typically removed, via tabs 14, 36 as described above, and placed on an appropriate surface, such as the ground. The serving container is oriented such that exterior surface 72 faces the ground, while interior surface 46 serves as the serving container bottom. Cap 28 is removed from spout 12 and the contents of the storage container are transferred into the serving container for consumption by the pet. The pet owner can consume the liquid by drinking directly from the spout or by pouring the liquid into a separate container, such as a cup. In either case, the pet does not contaminate the liquid that is consumed by the pet owner. When consumption is complete, the serving container is placed back on the storage container and the cap is placed on the spout. The above mentioned process may be performed or repeated in any fashion to enable the pet and/or pet owner to consume the contents of the storage container.

It will be appreciated that the embodiments described above and illustrated in the drawings represent only a few of the may ways of implementing a portable container for transporting and providing consumable substances to pets.

The storage container and serving container may be constructed of any quantity of parts (e.g., including a single molded container) and of any suitable plastic or other materials capable of containing liquid or food, such as food grade polyethylene. The carrying strap may be any strap, band or other device for engaging the portable container to facilitate easy transport. Further, any quantity of carrying straps may be utilized, or the portable container may be carried without a strap. The strap may facilitate transport of the portable container by the owner or pet by interfacing any body part of the owner or pet, such as the neck and/or shoulders. The portable container may be of any shape, size or color, and include any quantity of interior or exterior surfaces of any shape wherein the surfaces of the storage and serving containers may include ribs, dimples or other alterations to enhance aesthetics or gripping of the portable container. The storage and serving containers may further include a rounded or any other shaped bottom wherein the storage and serving containers may be rested on its front, back or other surface.

The interior and exterior surfaces of the storage and serving containers may be flat, rounded, non-planar or angled in any manner. Further, the storage and serving containers may include any quantity of tabs of any shape disposed at any locations capable of attaching and removing the serving container from the storage container and enabling a carrying strap to engage the storage container wherein the tabs and openings may be of any shape or size permitting engagement of a carrying strap. The serving container may alternatively be attached and removed from the storage container by applying appropriate forces to any location on storage and serving containers. Moreover, the serving container may include any quantity of slots or other receptacles disposed anywhere on the serving container for receiving the storage container tabs wherein the slots or receptacles may be of any shape or size. In addition, the storage container may include any type of fastener or projection, while the serving container may include any type of corresponding fastener or receptacle to enable attachment and removal of the serving container to the storage container. Alternatively, the serving container may be attached to the storage container by any connectors or attachment techniques.

The spout may be any type or shape of opening having any type of cover or cap to prevent spillage. Further, the spout may be of any size and disposed anywhere on the storage container. Moreover, any form of identification, such as photographs, tags, etc., may be disposed anywhere on the portable container. The lens may be of any shape compatible with the recess and may include any type of lens, glass or plastic enabling viewing of the identification indicia. The recess may be of any shape or size, while the lens may be constructed of plastic, glass or any other suitable material (e.g., polycarbonate).

It is to be understood that the portable container may be utilized by any type of pet, or even people, to consume the contents of the storage container. Further, the portable container may be utilized to carry any consumable substances, such as water or other drink or dried foods (e.g., dog, cat or bird food), wherein the serving container may be used to provide the substance to pets. Moreover, the portable container may be utilized to carry any quantity of substances wherein the serving container may be utilized to provide the substances to any quantity of pets. In addition, the portable container may be utilized to transport any types of substances (i.e., consumable or non-consumable).

From the foregoing description it will be appreciated that the invention makes available a novel portable container and method for transporting and providing consumable substances to pets wherein the portable container includes a storage container and a removable serving container for receiving the contents of the storage container to enable the contents to be consumed by a pet.

Having described preferred embodiments of a new and improved portable container for transporting and providing consumable substances to pets, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A portable container for storing and transporting a consumable liquid in a manner such that a pet and a human can consume the liquid without cross-contamination, said container comprising a storage container for storing the liquid, said storage container including a spout enabling the liquid to be poured into and from said storage container;

a serving container removably attached to said storage container and adapted when detached to receive the liquid poured from said storage container to enable the pet to consume the liquid; and a connector for removably attaching said serving container to said storage container, said connector including a projection disposed on one of said storage and serving containers, and a projection receptacle disposed on the other of said storage and serving containers to receive and engage said projection to effect attachment of said serving and storage containers;

wherein said serving container includes a substantially flat bottom portion;

wherein each of said storage and serving containers includes at least one tab;

wherein at least one slot is provided on one of said serving and storage containers;

wherein said tabs and said slot are disposed on said storage and serving containers such that said slot on said one of said containers receives a tab from the other container, and tabs of the two containers are positioned proximate one another when said the containers are attached to one another;

means responsive to forces applied in opposite directions to said adjacent tabs to facilitate removal of said serving container from said storage container by effecting movement of said containers in said opposite directions.

2. The container of claim 1 wherein said projection is disposed on said storage container and said projection receptacle is disposed on said serving container.

3. The container of claim 1 wherein said storage and serving containers each have a substantially annular cross-section permitting said storage container to be at least partially received in said serving container when the containers are attached to one another.

4. The container of claim 1 wherein said slot is provided on said serving container as an interruption of said projection receptacle.

5. The container of claim 4 further comprising a carry strap attached between two of said tabs to facilitate transport of said portable container.

6. The container of claim 1 wherein a recess is defined in said storage container to receive indicia identifying the pet and a lens to cover said indicia.

7. A portable container for transporting and providing a consumable substance to a pet comprising:

a storage container to store the substance, said storage container including a spout to enable the substance to be placed within and removed from said storage container;

a serving container removably attached to said storage container to receive the substance from said storage container and enable the pet to consume the substance;

a connector to removably attach said serving container to said storage container, said connector including a projection disposed on said storage container and a projection receptacle disposed on said serving container to engage said projection to facilitate attachment and removal of said serving container from said storage container;

said storage and serving containers each including a substantially circular cross-section with a tapered flat bottom portion; and said storage and serving containers each including at least one tab and said serving container further including at least one slot wherein each storage container tab and each serving container tab and slot are disposed on said respective storage and serving containers such that each storage container tab is disposed within a corresponding serving container slot and each serving container tab is positioned adjacent a corresponding storage container tab when said serving container is placed on said storage container, wherein force applied to said adjacent tabs facilitates attachment and removal of said serving container from said storage container.

8. The portable container of claim 7 further including a carrying strap attached to said storage container to facilitate transport of said portable container.

9. The portable container of claim 7 wherein said storage container includes indicia identifying the pet or a pet owner, and a lens to cover said indicia.

10. The portable container of claim 9 wherein said indicia include a photograph.

11. The portable container of claim 7 wherein said storage container includes a spout cover to engage said spout and prevent spillage.

* * * * *